United States Patent
Stoia et al.

(10) Patent No.: US 12,434,627 B2
(45) Date of Patent: Oct. 7, 2025

(54) DATA LINK THROUGH VEHICLE SAFETY SYSTEM

(71) Applicant: Microchip Technology Incorporated, Chandler, AZ (US)

(72) Inventors: Valentin Stoia, Bucharest (RO); Florentina-Giulia Stoica, Bucharest (RO); Simon Kahn, Jerusalem (IL)

(73) Assignee: Microchip Technology Incorporated, Chandler, AZ (US)

( * ) Notice: Subject to any disclaimer, the term of this patent is extended or adjusted under 35 U.S.C. 154(b) by 34 days.

(21) Appl. No.: 18/653,058

(22) Filed: May 2, 2024

(65) Prior Publication Data
US 2025/0263014 A1    Aug. 21, 2025

Related U.S. Application Data

(60) Provisional application No. 63/554,030, filed on Feb. 15, 2024.

(51) Int. Cl.
*B60Q 9/00*    (2006.01)
*B60R 16/023*    (2006.01)

(52) U.S. Cl.
CPC ............. *B60Q 9/00* (2013.01); *B60R 16/023* (2013.01)

(58) Field of Classification Search
CPC ................................ B60R 16/023; B60Q 9/00
See application file for complete search history.

(56) References Cited

U.S. PATENT DOCUMENTS

| | | | |
|---|---|---|---|
| 10,786,162 B2 | 9/2020 | Benson et al. | |
| 2009/0259369 A1 | 10/2009 | Saban | 701/45 |
| 2010/0032997 A1 | 2/2010 | Gold et al. | 297/217.1 |
| 2010/0253498 A1* | 10/2010 | Rork | B60R 22/48 |
| | | | 297/217.2 |
| 2013/0231582 A1 | 9/2013 | Prasad | 600/551 |
| 2015/0313475 A1* | 11/2015 | Benson | A61B 5/6893 |
| | | | 600/323 |

(Continued)

FOREIGN PATENT DOCUMENTS

| | | | | |
|---|---|---|---|---|
| CN | 111605452 A | 9/2020 | | B60N 2/28 |
| KR | 20180120901 A | 11/2018 | | A61B 5/01 |

(Continued)

OTHER PUBLICATIONS

International Search Report and Written Opinion, Application No. PCT/US2024/042481, 10 pages.

*Primary Examiner* — Omer S Khan
(74) *Attorney, Agent, or Firm* — SLAYDEN GRUBERT BEARD PLLC

(57) ABSTRACT

A device including a transceiver and a first logic circuit electrically coupled to the transceiver. The device including a first electrical conductor electrically coupled to the transceiver and to a first mechanical connection of a first vehicle safety system of a vehicle. The first mechanical connection to provide a first electrical path to a ground of the vehicle. The device including a second electrical conductor electrically coupled to the transceiver and to a second mechanical connection of a second vehicle safety system of the vehicle. The second vehicle safety system separate from the first vehicle safety system. The second mechanical connection to provide a data link to communicate data with a communication network of the vehicle.

18 Claims, 9 Drawing Sheets

(56) References Cited

U.S. PATENT DOCUMENTS

| | | | |
|---|---|---|---|
| 2016/0078737 A1 | 3/2016 | Cohen et al. | 340/457 |
| 2017/0129399 A1 | 5/2017 | Appukutty et al. | 340/457.1 |
| 2017/0202465 A1* | 7/2017 | Bartling | A61B 5/02427 |
| 2017/0324437 A1* | 11/2017 | Ruttler | G08B 21/0211 |
| 2020/0269807 A1* | 8/2020 | Tardif | B60N 2/272 |
| 2022/0234538 A1* | 7/2022 | Buttolo | A01K 27/004 |
| 2022/0295739 A1 | 9/2022 | Yoskowitz | |
| 2022/0396184 A1* | 12/2022 | Guo | B60N 2/2893 |
| 2024/0326689 A1* | 10/2024 | Nagasawa | B60N 2/0025 |

FOREIGN PATENT DOCUMENTS

| | | | |
|---|---|---|---|
| KR | 20220067958 A | 5/2022 | B60N 2/28 |
| WO | 2023/234870 A1 | 12/2023 | A01K 1/02 |

\* cited by examiner

DATA LINK THROUGH VEHICLE SAFETY SYSTEM

PRIORITY

This application claims priority to U.S. Provisional Application No. 63/554,030 filed Feb. 15, 2024, the entire contents of which is incorporated herein by reference.

TECHNICAL FIELD

The present disclosure relates to providing a data link through a mechanical connection of a vehicle safety system.

BACKGROUND

Many vehicles include mechanical connections as part of the vehicles safety systems that can be used to secure occupants within the vehicle. One example is a seatbelt system of a vehicle. Another example is a separate system such as an ISOFIX system including connections that may be used, e.g., as attachment points to secure a child's car seat in a vehicle independent of the seatbelt system. While ISOFIX refers to an international standard for such systems and connections, similar standards may be referred to by different names in different regions, e.g., Lower Anchors and Tethers for Children (LATCH) and Lower Universal Anchorage System (LUAS). Systems such as ISOFIX, LATCH, and LUAS may be referred to herein simply as ISOFIX, without limitation to any of those particular standards. ISOFIX connections and seatbelt connections typically include two components. ISOFIX connections typically include metal bars accessible through the back seat of a vehicle and useable as anchorage points and metal clasps for attaching to those anchorage points. ISOFIX connections are typically used to mechanically couple children's car seats to the vehicle. Seatbelt connections typically include a metal tongue that is inserted into a buckle that includes metal components to secure the tongue in place. Many vehicles also include an existing data network that connects through an onboard computer. The onboard computer may control various systems within the vehicle.

People often leave children and pets in vehicles unattended, which can lead to tragic consequences. Every year children die from heat exposure in hot vehicles. While there have been attempts to develop car seats with sensors to monitor conditions of seated children, such car seats or other devices may not be able to reliably warn others of unsafe conditions, especially when the vehicle is turned off.

Examples of the present disclosure may address one or more of these issues.

SUMMARY

Aspects and examples of the present disclosure provide a robust data link to a vehicle's data network and onboard computer. In some examples the data link may be used to monitor conditions of occupants in the vehicle and to initiate corrective actions.

One aspect may include a device. For example, the device may include a transceiver and a first logic circuit electrically coupled to the transceiver. The device may include a first electrical conductor electrically coupled to the transceiver and to a first mechanical connection of a first vehicle safety system of a vehicle. The first mechanical connection may provide a first electrical path to a ground of the vehicle. The device may include a second electrical conductor electrically coupled to the transceiver and to a second mechanical connection of a second vehicle safety system of the vehicle. The second vehicle safety system may be separate from the first vehicle safety system. The second mechanical connection may provide a data link to communicate data with a communication network of the vehicle.

Another aspect may include a method. For example, the method may include receiving by a first logic circuit a first signal from a peripheral device. The method may include processing by the first logic circuit the first signal to develop a second signal and communicating the second signal to a first one-wire transceiver. The method may include transmitting with a one-wire communication protocol the second signal via a mechanical connection of a first safety system of a vehicle. The method may include receiving by a second one-wire transceiver the second signal via the mechanical connection.

Another aspect may include a system. For example, the system may include a first data bridge including a first transceiver and a first logic circuit. The system may include a first mechanical connection electrically coupled to the first data bridge and a vehicle ground via a first vehicle safety system of a vehicle. The system may include a second data bridge including a second transceiver and a second logic circuit. The second data bridge may be electrically coupled to a power source of the vehicle and communicatively coupled to a communication network of the vehicle. The system may include a second mechanical connection electrically coupled to the first data bridge and the second data bridge via a second vehicle safety system of the vehicle separate from the first vehicle safety system. The second mechanical connection may provide an electrical path for power delivery from the power source of the vehicle and a data link for data communication with the communication network of the vehicle via the second data bridge.

BRIEF DESCRIPTION OF THE DRAWINGS

The figures illustrate aspects of data link circuits and systems of the present disclosure.

The reference number for illustrated elements that appears in multiple different figures has the same meaning across the multiple figures, and the mention or discussion herein of any illustrated element in the context of any particular figure also applies to each other figure, if any, in which that same illustrated element is shown. In some figures, certain elements may be omitted for clarity when discussing aspects or examples of other elements.

DESCRIPTION

Aspects of the present disclosure include providing two-way data communication and power through the mechanical connections of a vehicles safety system, e.g., a vehicle's ISOFIX and seatbelt connections, without limitation. One mechanical connection may be used to provide an electrical ground, and another can be used to provide a data and power connection, e.g., via a one-wire connection and protocol. As an example, an ISOFIX connection may be used to provide the electrical ground and a seatbelt connection may be used to provide data and power. As another example, a seatbelt connection may be used to provide the electrical ground and an ISOFIX connection may be used to provide data and power.

Figure 1:
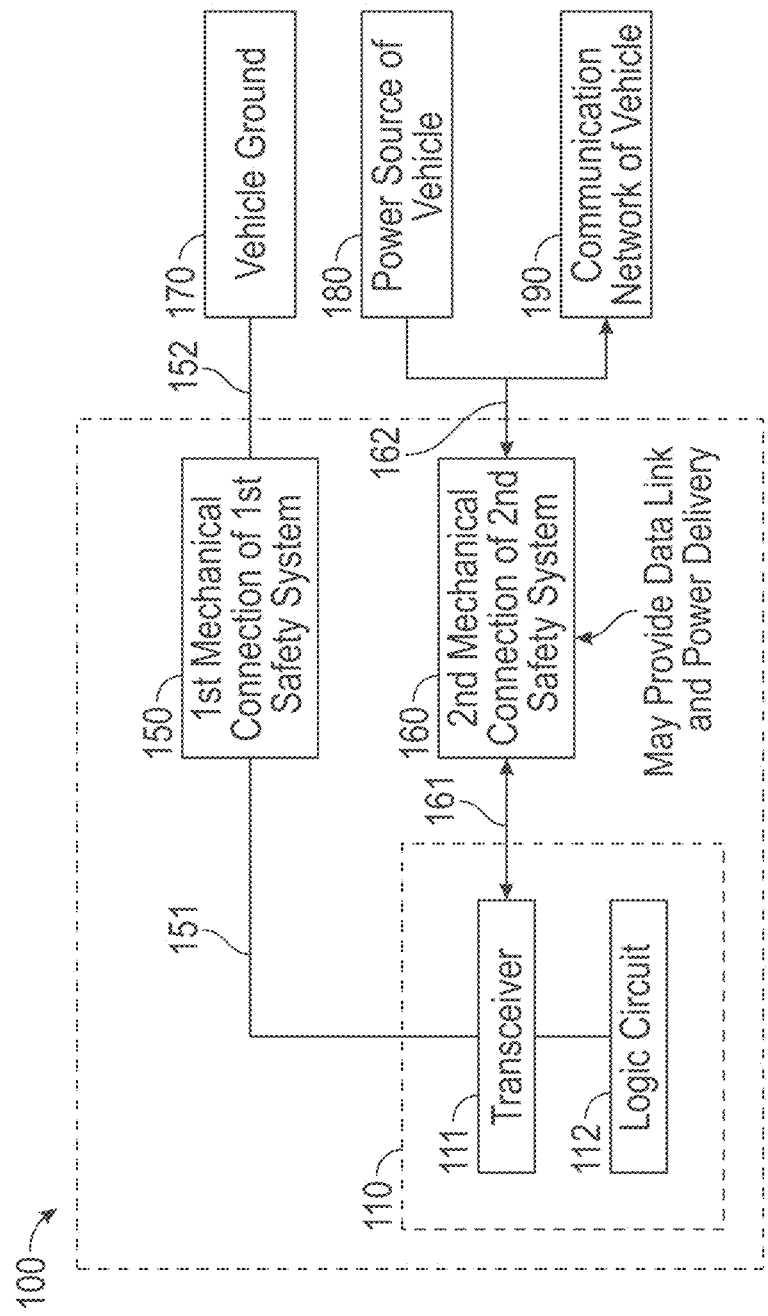
FIG. 1 illustrates a data link circuit.

Referring to FIG. 1, there is provided an illustration of data link circuit 100. Data link circuit 100 may include data bridge 110. Data bridge 110 may include transceiver 111 and logic circuit 112. Transceiver 111 may be communicatively coupled to logic circuit 112 to transmit data signals between logic circuit 112 and transceiver 111. Transceiver 111 may be electrically coupled to a first mechanical connection 150 of a first vehicle safety system of the vehicle via first electrical conductor 151. First mechanical connection 150 may be electrically coupled via fourth electrical conductor 152 to vehicle ground 170, which may be a ground of the vehicle. Electrical conductors 151 and 152 and first mechanical connection 150 may provide a first electrical path to a ground of the vehicle such as vehicle ground 170. Transceiver 111 may be electrically coupled to a second mechanical connection 160 of a second vehicle safety system of the vehicle via a second electrical conductor 161, where the second vehicle safety system is separate from the first vehicle safety system. The second electrical conductor 161 and second mechanical connection 160 may provide a data link to communicate data with a communication network 190 of the vehicle via third electrical conductor 162 electrically coupled to second mechanical connection 160. In some examples, electrical conductors 161 and 162 and second mechanical connection 160 may also provide a second electrical path for power delivery from a power source 180 of the vehicle.

There are various ways components may be electrically coupled and communicatively coupled within the scope of the present disclosure. Components may be electrically coupled by any suitable electrical conductor for transferring power, e.g., pins, wires, busses, vias, or other electrical pathways, without limitation. Components may be communicatively coupled by any suitable mechanism for transferring signals. In some examples, components may be communicatively coupled by electrically coupling the components. In other examples, components may be communicatively coupled by a wireless connection, e.g., WiFi, Bluetooth, cellular, or any other suitable wireless mechanism or protocol.

In some examples, the first mechanical connection 150 may be an ISOFIX connection and the first vehicle safety system may be an ISOFIX system. In some examples, the second mechanical connection 160 may be a seatbelt connection and the second vehicle safety system may be a seatbelt system. In other examples, the first mechanical connection 150 may be a seatbelt connection and the first vehicle safety system may be a seatbelt system. In yet other examples, the second mechanical connection 160 may be an ISOFIX connection and the second vehicle safety system may be an ISOFIX system. The physical contact of metallic components of first mechanical connection 150 and second mechanical connection 160 may provide electrical coupling between the mating parts of those mechanical connections. As one example, an ISOFIX connection may include an anchor point (e.g., a metal bar behind the seat cushion, without limitation) and a mechanical attachment (e.g., a clasp, hook, or latch, without limitation) that may be connected to the anchor point to form a mechanical connection, e.g., first mechanical connection 150. First electrical conductor 151 may be coupled to the mechanical attachment that may be connected to the anchor point. In some examples, the anchor point may be electrically coupled to the vehicle ground 170 (e.g., by attaching fourth electrical conductor 152 to the anchor point and to vehicle ground 170). By connecting the mechanical attachment to the anchor point, an electrical path through first mechanical connection 150 to vehicle ground 170 may be created. As another example, a seatbelt connection may include a metal tongue that is inserted into a buckle to form a mechanical connection, e.g., second mechanical connection 160. Metal components within the buckle may secure the tongue in place and also electrically couple the tongue to the buckle. Second electrical conductor 161 may be electrically coupled to the seatbelt tongue, and third electrical conductor 162 may be electrically coupled to the metallic component of the seatbelt buckle that physically contacts the tongue. By connecting the metallic tongue and buckle components, an electrical path through mechanical connection 160 may be created and used to transfer power and data as described herein. Third electrical conductor 162 may be provided woven into seatbelt fabric, or may be provided as a border on one or more edges of the seatbelt fabric, without limitation. Second electrical conductor 161 may be similarly provided, or may be provided as additional connector arranged to mate with the buckle.

In some examples, transceiver 111 of data bridge 110 may send and receive data to, and from, communication network 190 of the vehicle through third electrical conductor 162, second mechanical connection 160, and electrical conductor 161 using a one-wire (or single-wire) connection and protocol, e.g., a Local Interconnect Network (LIN) connection and protocol. In some examples, data bridge 110 may send and receive data to, and from, communication network 190 of the vehicle and receive power from power source 180 of the vehicle through the second mechanical connection 160 and electrical conductor 161 using a one-wire (or single-wire) connection and protocol, e.g., a LIN-over-DC-power-line (DC-LIN) connection and protocol. Transceiver 111 may be a DC-LIN transceiver to transmit and receive data over a DC powerline. In some examples, communication network 190 of the vehicle may be a controller area network (CAN), local area network (LAN), Ethernet network, wireless network (e.g., WiFi or Bluetooth, without limitation), or any other suitable communications network for communicating data within a vehicle.

Transceiver 111 may be any suitable transceiver that transmits and receives data over a one-wire connection such as electrical conductor 161 via second mechanical connection 160. In some examples, transceiver 111 may also receive and transmit power over a one-wire connection such as electrical conductor 161 via second mechanical connection 160. Examples of transceiver 111 may include LIN transceivers and DC-LIN transceivers, without limitation. In some examples, data bridge 110 may provide power to, and communicate data with, a connected device as described with respect to FIG. 2. Power source 180 of the vehicle may be any suitable power source for providing power to data bridge 110, e.g., a battery, an alternator, an inverter, or a converter, without limitation. In some examples, power source 180 provides DC power, e.g., 12V DC power, without limitation.

Logic circuit 112 may process data signals received by transceiver 111 and may process data signals received from a connected device (not shown) to be transmitted by transceiver 111, e.g., to communication network 190 of the vehicle. Logic circuit 112 may be implemented in any suitable manner, such as by a processor, microcontroller (MCU), an application specific integrated circuit (ASIC), a field programmable gate array (FPGA), a programmable logic device (PLD), state machine, reprogrammable logic or hardware, analog circuitry, digital circuitry, digital logic, instructions for execution by a processor, or any suitable combination thereof, without limitation. In some examples, logic circuit 112 may receive and process data from multiple sources.

Figure 2:
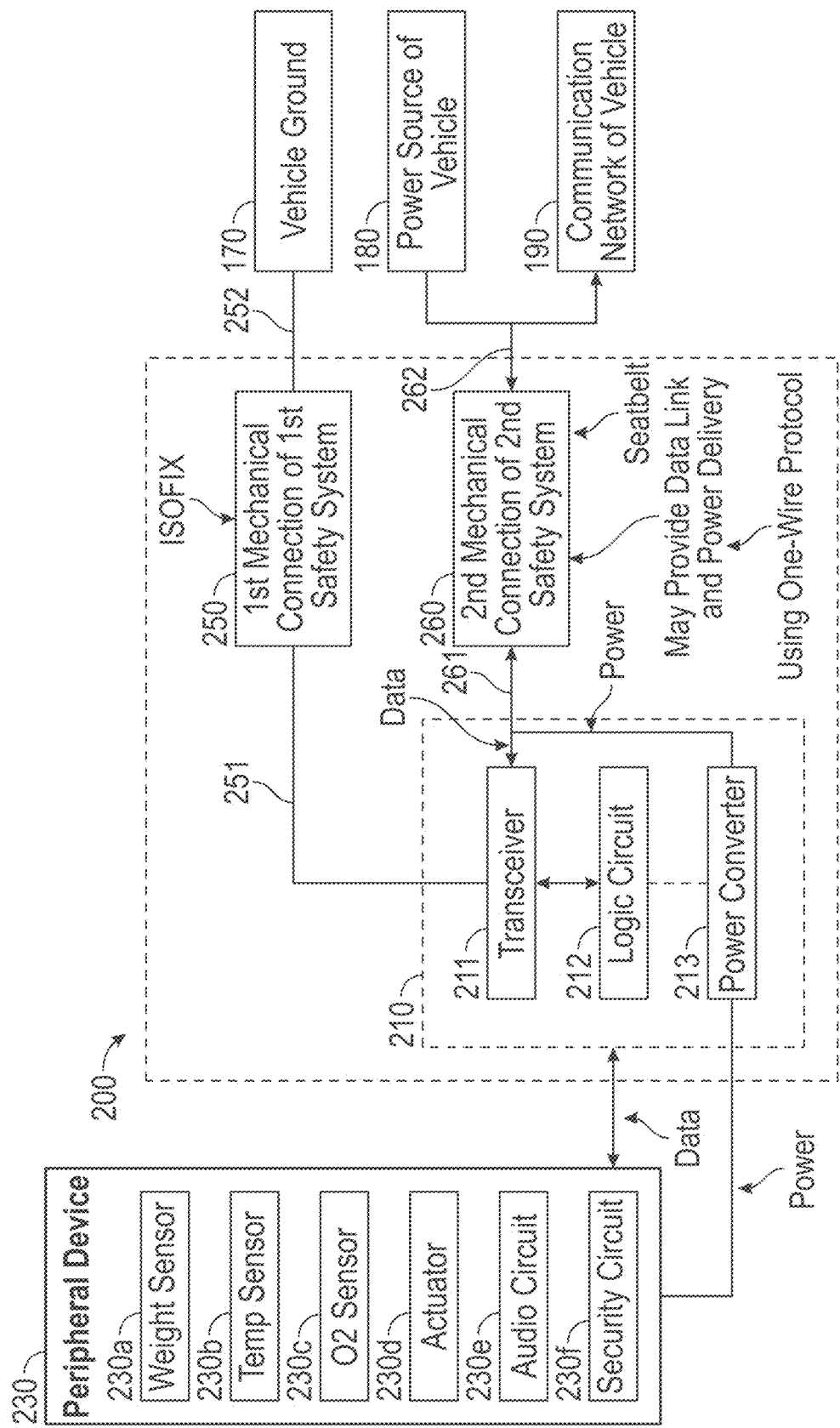
FIG. 2 illustrates a data link circuit and peripheral device.

Referring to FIG. 2, there is provided an illustration of data link circuit 200. Descriptions of like numbered elements as shown in FIG. 1 and previously described are not repeated for brevity. Data link circuit 200 may include data bridge 210. Data bridge 210 may include transceiver 211 and logic circuit 212. Transceiver 211 may be communicatively coupled to logic circuit 212 to transmit data signals between logic circuit 212 and transceiver 211. Transceiver 211 may be electrically coupled to a first mechanical connection 250 of a first vehicle safety system of the vehicle via first electrical conductor 251. First mechanical connection 250 may be electrically coupled to vehicle ground 170 via fourth electrical conductor 252. Electrical conductors 251 and 252 and first mechanical connection 250 may provide a first electrical path to a ground of the vehicle such as vehicle ground 170. Transceiver 211 may be electrically coupled to a second mechanical connection 260 of a second vehicle safety system of the vehicle via a second electrical conductor 261, where the second vehicle safety system is separate from the first vehicle safety system. The second electrical conductor 261 and second mechanical connection 260 may provide a data link to communicate data with a communication network 190 of the vehicle via third electrical conductor 262. In some examples, second electrical conductor 261 and second mechanical connection 260 may also provide a second electrical path for power delivery from a power source 180 of the vehicle. Data bridge 210 may also include power converter 213 electrically coupled to the second electrical conductor 261. Power converter 213 may be electrically coupled to one or more peripheral devices, such as peripheral device 230, to provide power to the one or more peripheral devices. Logic circuit 212 may be communicatively coupled to peripheral device 230 to communicate data with peripheral device 230. Peripheral device 230 may include one or more sensors, e.g., weight sensor 230a, temperature sensor 230b, or oxygen (O2) sensor 230c, without limitation. In some examples, peripheral device may also include actuator 230d, audio circuit 230e, and security circuit 230f. Although one peripheral device 230 is shown in FIG. 2, in some examples, additional peripheral devices may also be included.

Data bridge 210 may implemented similar to data bridge 110, as described above with the addition of power converter 213. Transceiver 211 may be implemented similar to transceiver 111, as described above. Logic circuit 112 may implemented similar to logic circuit 112, as described above. Electrical conductors 251, 252, 261, and 262 may be implemented similar to electrical conductors 151, 152, 161, and 162, respectively, as described above. First mechanical connection 250 may be implemented similar to first mechanical connection 150, as described above. Second mechanical connection 260 may be implemented similar to second mechanical connection 160, as described above, and may provide a data link to communicate data with communication network 190 of the vehicle and deliver power to data bridge 210 from power source 180 of the vehicle. Data may be communicated through second mechanical connection 260 and electrical conductors 261 and 262 using a one-wire protocol, e.g., LIN or DC-LIN, without limitation.

Power converter 213 may be any suitable power converter to convert power received from a power source such as vehicle power source 180 at one voltage to another voltage. In some examples, power converter 213 may be a DC-DC power converter and may convert DC power at one voltage, e.g., 12V, to another DC voltage, e.g., 5V, 3.3 V, or 1.8V, without limitation. In other examples, power converter 213 may be an AC-DC power converter to convert AC power at one voltage, e.g., 120V, to a DC voltage, e.g., 12V, 5V, 3.3 V, or 1.8V, without limitation. In other examples, power converter 213 may be a DC-AC power converter (which may also refer to as an inverter) to convert DC power at one voltage to an AC voltage. In some examples, power converter 213 may provide power to one or more peripheral devices, such as peripheral device 230. In some examples, peripheral device 230 may include an internal power source such as a battery (not shown). In some examples, power converter 213 may provide power at an appropriate voltage for other components of data bridge 210, e.g., to logic circuit 212 as indicated by the dashed line between power converter 213 and logic circuit 212, which may be used to electrically couple power converter 213 and logic circuit 212.

In some examples, peripheral device 230 may be a portable computing device, e.g., a smart phone, a tablet, a laptop, without limitation. In some examples, peripheral device 230 may be used to monitor the health condition of an occupant of the vehicle. In some examples, peripheral device 230 may receive power from vehicle power source 180 and communicate data with vehicle communication network 190 via data bridge 210 of data link circuit 200. In some examples, peripheral device 230 may include sensors, e.g., one or more of sensors 230a-230c, to monitor a condition of an occupant (e.g., a person or an animal) of the vehicle. In some examples, as described with reference to FIG. 4, peripheral device 230 may include a car seat to secure the occupant within the vehicle. In some examples, as described with reference to FIG. 5, the occupant may be a pet and peripheral device 230 may include a pet tether to secure the occupant within the vehicle. Weight sensor 230a may be used to determine if an occupant is present in a seat of the vehicle. In some examples, a logic circuit such as logic circuit 212 may receive signals from weight sensor 230a and determine the signals indicate an occupant is present. A logic circuit such as logic circuit 212 may receive signals from temperature sensor 230b and determine the signals indicate the temperature of an occupant is outside of a normal healthy range, e.g, below 97° F. or above 100° F. for a human occupant. In some examples, temperature sensor 230b may be similarly used to determine if the temperature within the vehicle is above or below a threshold value indicating the occupant of the vehicle is in an unsafe condition. A logic circuit such as logic circuit 212 may receive signals from oxygen sensor 230c and determine the signals indicate the oxygen level of an occupant is outside of a normal healthy range. In some examples, oxygen sensor 230c may be similarly used to determine if the oxygen level within the vehicle is below a threshold value indicating the occupant of the vehicle is in an unsafe condition. In response to determining that an occupant is in a hazardous condition, a logic circuit such as logic circuit 212 may send a signal to actuator 230d to take corrective action. For example, actuator 230d may comprise a fan that may be activated to reduce the temperature condition of an occupant or an oxygen disperser that may be activated to increase the oxygen level in the vehicle, without limitation. Audio circuit 230e may include a microphone, a speaker, or a combination thereof. In some examples, a logic circuit such as logic circuit 212 may receive signals from audio circuit 230e and determine the signals indicate an occupant is present and whether the occupant is in audible distress. In some examples, audio circuit 230e may be used to communicate with the occupant or to provide an audible alert indicating to others that the occupant is in distress. In some examples, security circuit 230f may include data encryption and decryption features to provide data security during data communication with other components such as logic circuit 212. Security circuit 230f may also include authentication features to authenticate connected components and prevent unauthorized use of data link circuit 200. In some examples, peripheral device 230 may also include radio frequency (RF) interfaces to communicate with other components wirelessly, e.g., via Bluetooth, WiFi, cellular (e.g., GSM, 3G, 4G, 5G), without limitation. In some examples, peripheral device 230 may also include cable interfaces to communicate with other components via wired connections, e.g., serial or USB without limitation. In some examples, data bridge 210 may be separate from peripheral device 230. In other examples, data bridge 210 may be integrated with peripheral device 230.

In some examples, peripheral device 230 may include a logic circuit (not shown) separate from logic circuit 212 to receive signals from sensors (e.g., sensors 230a-230c) and process those signals to determine information about the condition of an occupant and communicate that information to logic circuit 212. In that situation, the optional logic circuit of peripheral device 230 may send processed signals to logic circuit 212 for further processing and potential corrective action. In some examples, logic circuit 212 may communicate data via transceiver 211, electrical conductor 261, second mechanical connection 260, and electrical conductor 262 to communication network 190 of the vehicle. In some examples, the vehicle may include a logic circuit (not shown) separate from logic circuit 212 and the logic circuit of the vehicle may determine appropriate corrective actions, which may include activating an alert system of the vehicle as described below.

Figure 3:
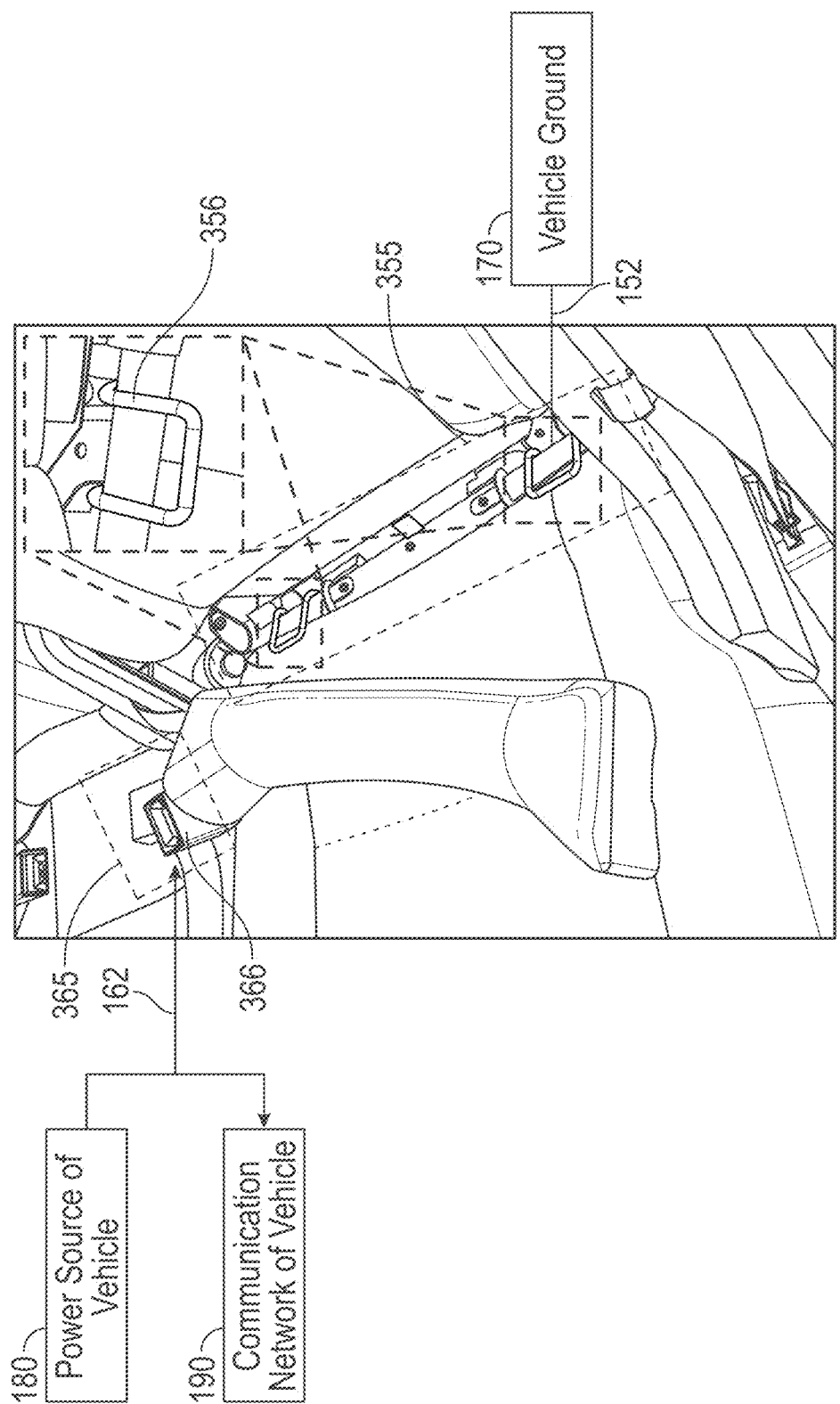
FIG. 3 illustrates mechanical connections to vehicle safety systems.

Referring to FIG. 3, an illustration of mechanical connections to vehicle safety systems is provided. A vehicle may include a first safety system in the form of an ISOFIX system 355. ISOFIX system 355 may include ISOFIX anchors 356 that may be used to make a mechanical connection such as first mechanical connections 150 and 250 as previously described. The vehicle may include a second safety system in the form of a seatbelt system 365. Seatbelt system 365 may include seatbelt buckle 366 that may be used to make a mechanical connection, such as second mechanical connections 160 and 260 as previously described. In some examples, ISOFIX anchors 356 may be electrically coupled to a vehicle ground, such as vehicle ground 170, via an electrical conductor, such as fourth electrical conductor 152, as previously described. In some examples, seatbelt buckles 366 may be electrically coupled to a power source of the vehicle, such as vehicle power source 180, via an electrical conductor such as third electrical conductor 162, as previously described. In some examples, seatbelt buckles 366 may be communicatively coupled to a communication network of the vehicle, such as vehicle communication network 190. In some examples, communicative coupling may be provided by an electrical conductor, such as third electrical conductor 162, as previously described.

Figure 4:
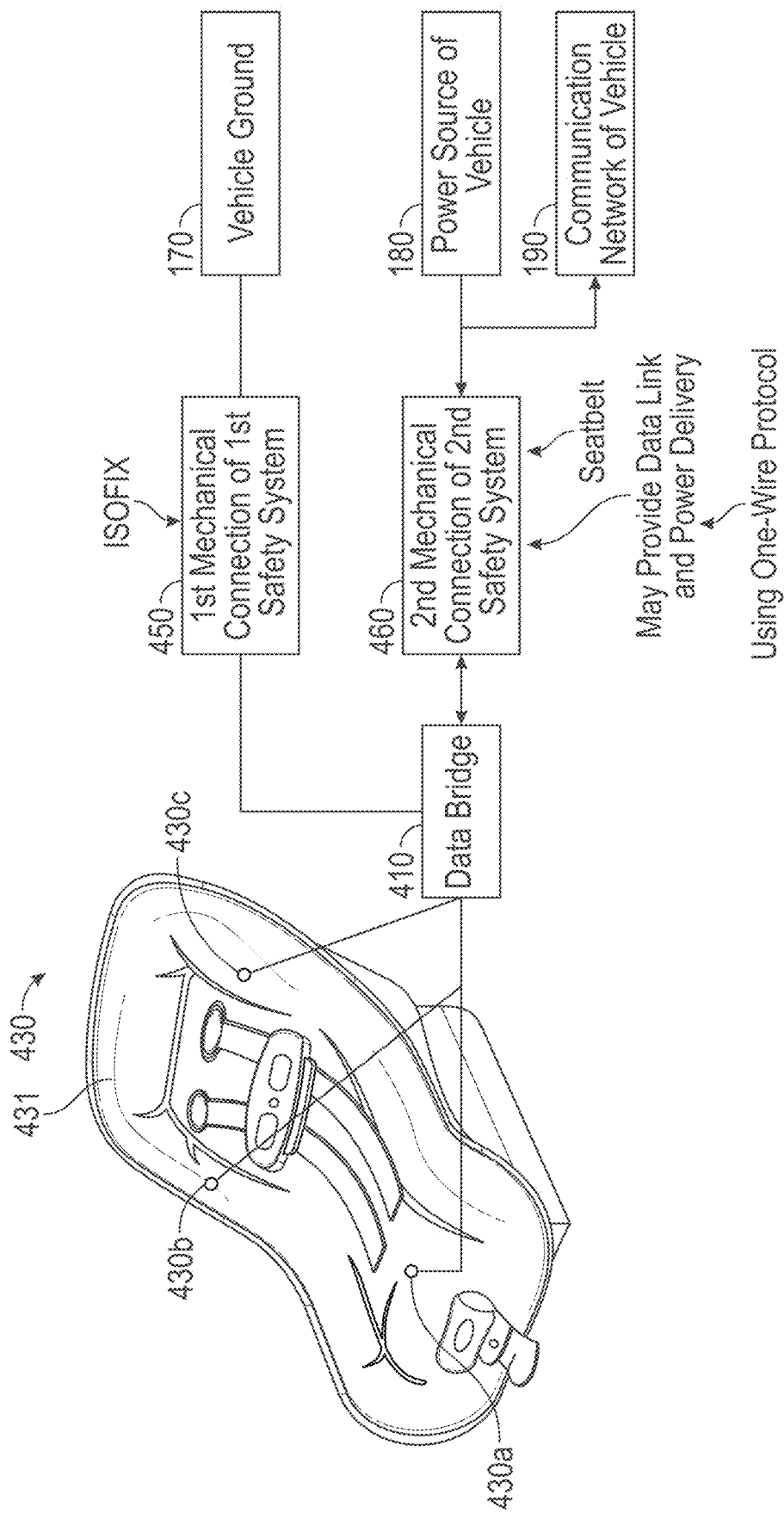
FIG. 4 illustrates a car seat peripheral device.

Referring to FIG. 4, an illustration of peripheral device 430 is provided. Peripheral device 430 may be implemented similar to peripheral device 230. Peripheral device 430 may comprise car seat 431. Car seat 431 may include weight sensor 430a, temperature sensor 430b, oxygen sensor 430c, or any combination thereof. Weight sensor 430a may be implemented similar to weight sensor 230a as described above. Temperature sensor 430b may be implemented similar to temperature sensor 230b as described above. Oxygen sensor 430c may be implemented similar to oxygen sensor 230c as described above. Data bridge 410 may be implemented similar to data bridge 110 and 210 as previously described. First mechanical connection 450 may be implemented similar to first mechanical connection 150 and 250, as described above. Second mechanical connection 460 may be implemented similar to second mechanical connection 160 and 260, as described above, and may provide a data link to communicate data with communication network 190 of the vehicle and deliver power to data bridge 410 from power source 180 of the vehicle. Data may be communicated through second mechanical connection 460 using a one-wire protocol, e.g., LIN or DC-LIN, without limitation. In some examples, data bridge 410 may be separate from peripheral device 430. In other examples, data bridge 410 may be integrated with peripheral device 430. In some examples car seat 431 may be used to secure an occupant within the vehicle using first mechanical connection 450, second mechanical connection 460, or a combination thereof. Although car seat 431 is illustrated as a child car seat, in some examples, car seat 431 may be a passenger seat of the vehicle.

Figure 5:
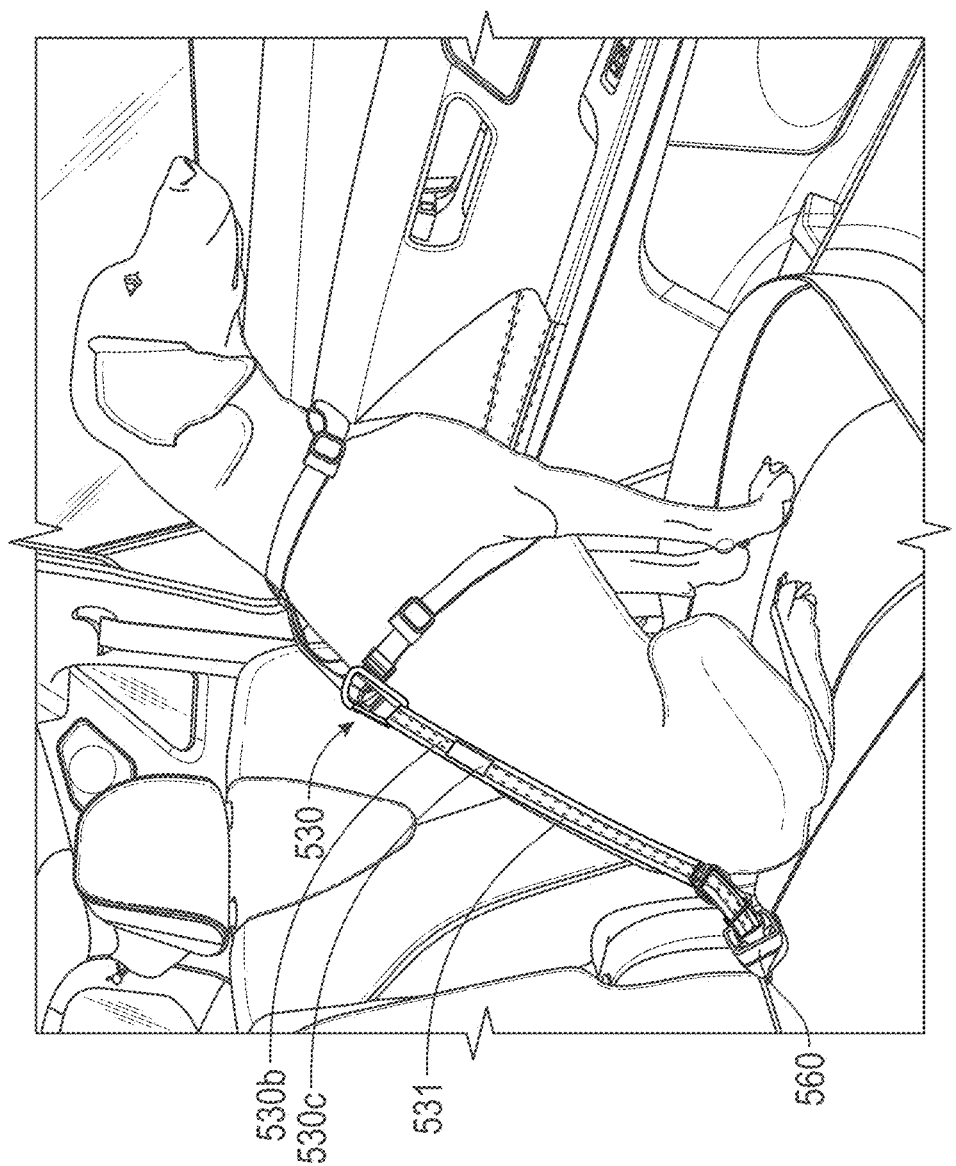
FIG. 5 illustrates a pet tether peripheral device.

Referring to FIG. 5, an illustration of peripheral device 530 is provided. Peripheral device 530 may be implemented similar to peripheral device 230. Peripheral device 530 may comprise a pet tether 531. Pet tether 531 may include temperature sensor 530b and oxygen sensor 530c, or any combination thereof. In some examples, pet tether 531 may include additional sensors. Temperature sensor 530b may be implemented similar to temperature sensor 230b as described above. Oxygen sensor 530c may be implemented similar to oxygen sensor 230c as described above. A first mechanical connection (not shown) may be implemented similar to first mechanical connection 150 and 250, as described above, which may include an ISOFIX connection. Second mechanical connection 560 may be implemented similar to second mechanical connection 160 and 260, as described above, which may include a seatbelt connection. Pet tether 531 may comprise an electrical conductor woven into the pet tether fabric, or may be provided as a border on one or more edges of the pet tether fabric, without limitation, as described above in relation to third electrical conductor 162. In some examples pet tether 531 may be used to secure an occupant within the vehicle, where the occupant is a pet. Pet tether 531 may be used to secure the pet using first mechanical connection 550, second mechanical connection 560, or a combination thereof.

Figure 6:
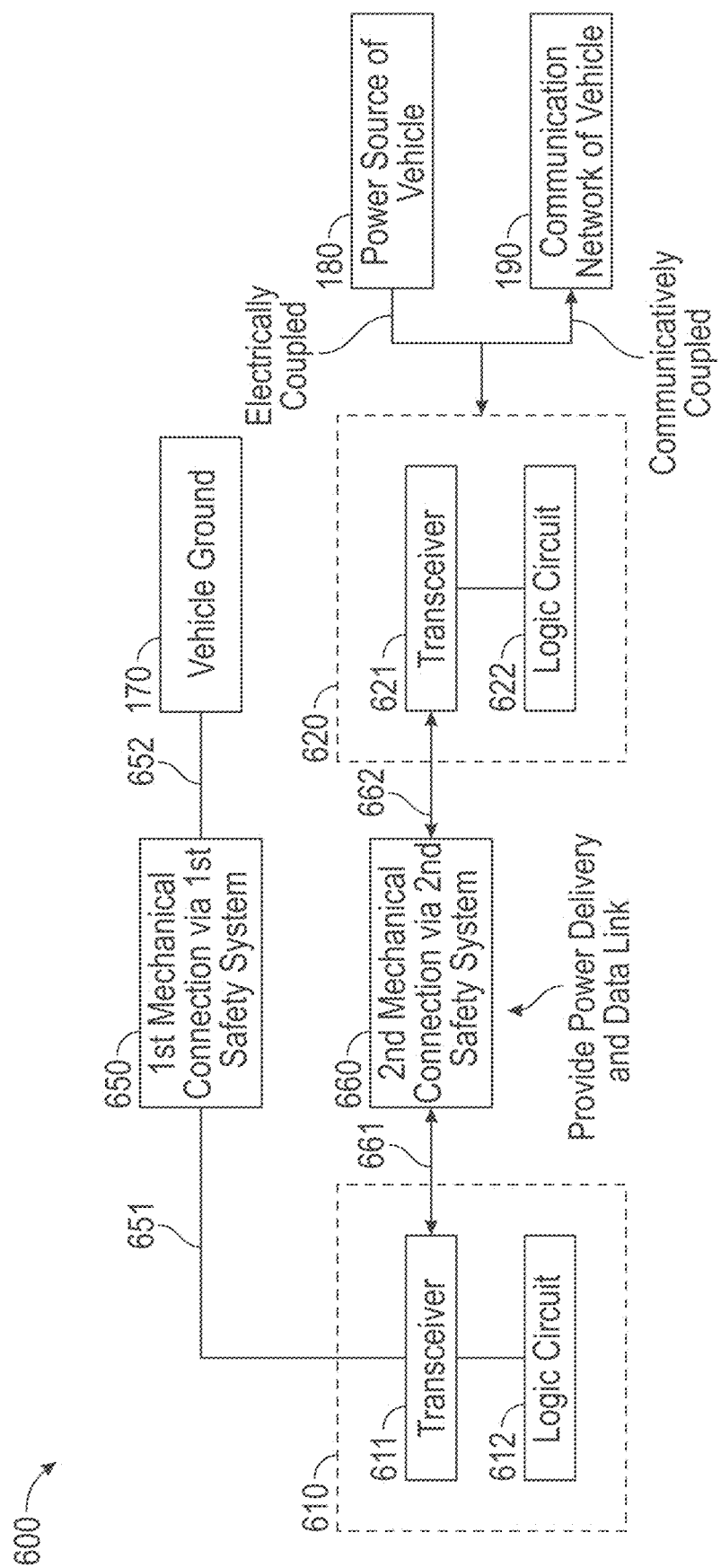
FIG. 6 illustrates a data link system.

Referring to FIG. 6, an illustration of a data link system 600 is provided. Descriptions of like numbered elements as shown in FIG. 1 and previously described are not repeated for brevity. Data link system 600 may include a first data bridge 610. First data bridge 610 may include a first transceiver 611 and a first logic circuit 612. First transceiver 611 may be communicatively coupled to logic circuit 612 to transmit data signals between logic circuit 612 and first transceiver 611. First transceiver 611 may be electrically coupled to a first mechanical connection 650 of a first vehicle safety system of the vehicle via first electrical conductor 651. First mechanical connection 650 may be electrically coupled to vehicle ground 170 via fourth electrical conductor 652. Electrical conductors 651 and 652 and first mechanical connection 650 may provide a first electrical path to a ground of the vehicle such as vehicle ground 170. First transceiver 611 may be electrically coupled to a second mechanical connection 660 of a second vehicle safety system of the vehicle via a second electrical conductor 661, where the second vehicle safety system is separate from the first vehicle safety system. Second mechanical connection 660 may be electrically coupled a second data bridge 620 via a third electrical conductor 662. Second data bridge 620 may include a second transceiver 621 and a second logic circuit 622. The second electrical conductor 661, second mechanical connection 660, and third electrical conductor 662 may provide a data link to communicate data with a communication network 190 of the vehicle via second data bridge 620. In some examples, second electrical conductor 661, second mechanical connection 660, and third electrical conductor 662 may also provide a second electrical path for power delivery from a power source 180 of the vehicle via second data bridge 620.

First and second data bridges 610 and 620 may be respectively implemented similar to data bridges 110, 210, and 410, as described above. First and second transceivers 611 and 621 may be respectively implemented similar to transceivers 111 and 211, as described above. First and second logic circuits 612 and 622 may be respectively implemented similar to logic circuits 112 and 212, as described above. Electrical conductor 651 may be implemented similar to electrical conductors 151 and 251, as described above. Electrical conductor 652 may be implemented similar to electrical conductors 152 and 252, as described above. Electrical conductor 661 may be implemented similar to electrical conductors 161 and 261, as described above. Electrical conductor 662 may be implemented similar to electrical conductors 162 and 262, as described above. First mechanical connection 650 may be implemented similar to first mechanical connections 150, 250, and 450, as described above. Second mechanical connection 660 may be implemented similar to second mechanical connections 160, 260, 460, and 560, as described above, and may provide a data link to communicate data with communication network 190 of the vehicle and deliver power to first data bridge 610 from power source 180 of the vehicle via second data bridge 620.

Data link system 600 may include two data bridges, 610 and 620, on either side of second mechanical connection 660. Second data bridge 620 may be electrically coupled to vehicle power source 180. Second data bridge 620 may be communicatively coupled to vehicle communication network 190. Second transceiver 621 may communicate data with first transceiver 611 and deliver power to first transceiver 611 through second mechanical connection 660 using a one-wire connection and protocol, e.g., LIN or DC-LIN, without limitation. Second data bridge 620 may receive power from vehicle power source 180 of the vehicle. In some examples, second transceiver 621 may receive power directly from vehicle power source 180 and deliver power to first transceiver 611 via second mechanical connection 660. In some examples, second data bridge 620 may include a power converter (not shown) that may convert power received from vehicle power source 180 from a first voltage level to a second voltage level before transceiver 621 receives power. Second transceiver 621 may then deliver power at the second voltage to first transceiver 611 via second mechanical connection 660. The optional power converter for data bridge 620 may be implemented similar to power convert 213 as described above.

Figure 7:
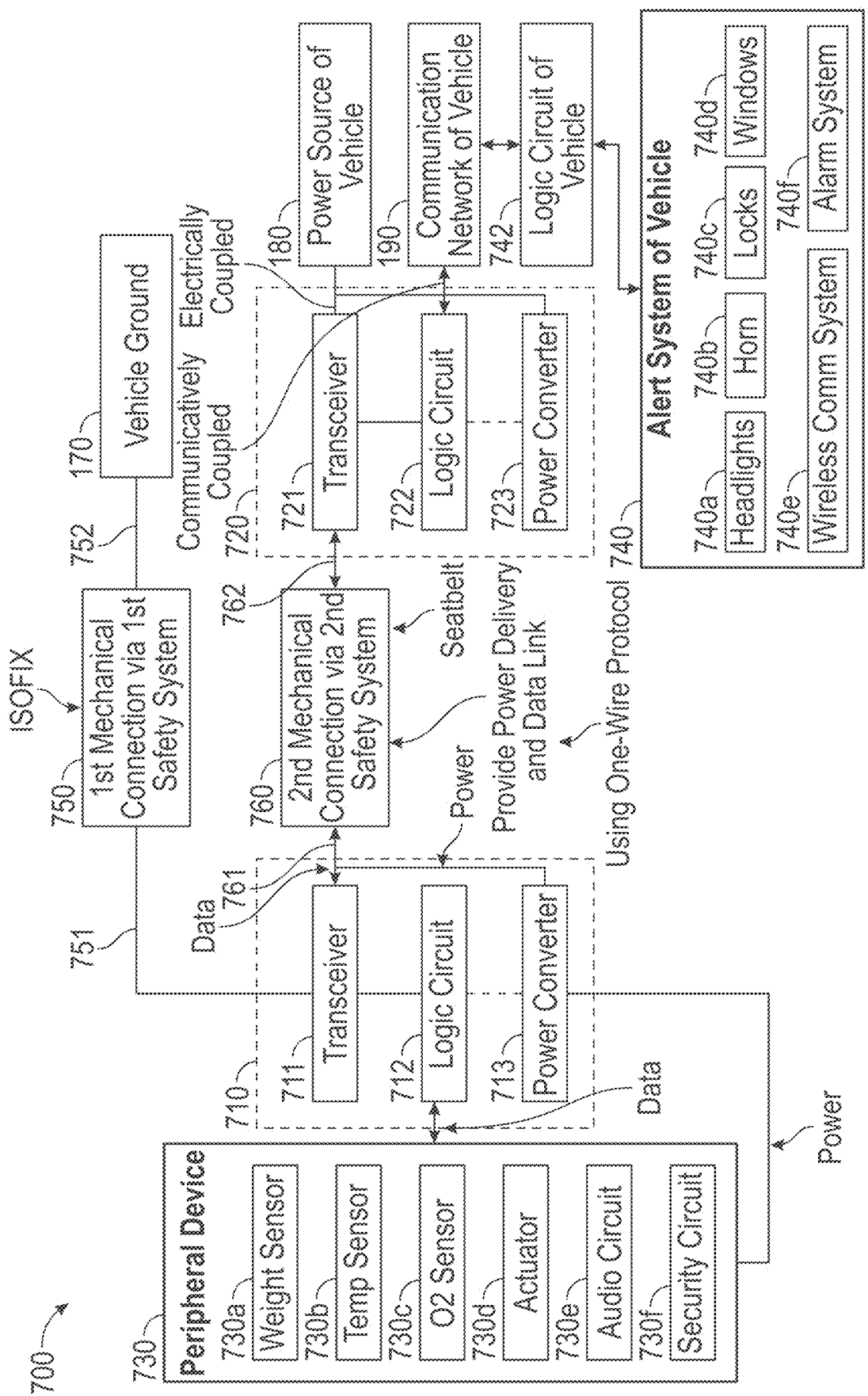
FIG. 7 illustrates a data link system and peripheral device.

Referring to FIG. 7, an illustration of data link system 700 is provided. Descriptions of like numbered elements as shown in FIG. 1 and previously described are not repeated for brevity. Data link system 700 may include a first data bridge 710 and second data bridge 720. First data bridge 710 may include a first transceiver 711 and a first logic circuit 712. First transceiver 711 may be communicatively coupled to first logic circuit 712 to transmit data signals between first logic circuit 712 and first transceiver 711. First transceiver 711 may be electrically coupled to a first mechanical connection 750 of a first vehicle safety system of the vehicle, e.g., an ISOFIX connection of an ISOFIX system, via first electrical conductor 751. First mechanical connection 750 may be electrically coupled to vehicle ground 170 via fourth electrical conductor 752. Electrical conductors 751 and 752 and first mechanical connection 750 may provide a first electrical path to a ground of the vehicle such as vehicle ground 170. First transceiver 711 may be electrically coupled to a second mechanical connection 760 of a second vehicle safety system of the vehicle, e.g., a seatbelt connection of a seatbelt system, via a second electrical conductor 761, where the second vehicle safety system is separate from the first vehicle safety system. Second mechanical connection 760 may be electrically coupled a second data bridge 720 via a third electrical conductor 762. Second data bridge 720 may include a second transceiver 721 and a second logic circuit 722. The second electrical conductor 761, second mechanical connection 760, and third electrical conductor 762 may provide a data link to communicate data with a communication network 190 of the vehicle via second data bridge 720. In some examples, second electrical conductor 761, second mechanical connection 760, and third electrical conductor 762 may also provide a second electrical path for power delivery from a power source 180 of the vehicle via second data bridge 720.

First data bridge 710 may include first power converter 713 electrically coupled to the second electrical conductor 761. First power converter 713 may be electrically coupled to one or more peripheral devices, such as peripheral device 730, to provide power to the one or more peripheral devices. First logic circuit 712 may be communicatively coupled to peripheral device 730 to communicate data with peripheral device 730. Peripheral device 730 may include one or more sensors, e.g., weight sensor 730a, temperature sensor 730b, or oxygen (O2) sensor 730c, without limitation. In some examples, peripheral device may also include actuator 730d, audio circuit 730e, and security circuit 730f. Although one peripheral device 730 is shown in FIG. 7, in some examples, additional peripheral devices may also be included. Second data bridge 720 may include a second power converter 723 that may convert power received from vehicle power source 180 from a first voltage level to a second voltage level, which power at the second voltage level may be provided to second transceiver 721. Second transceiver 721 may then deliver power at the second voltage to first transceiver 711 via second mechanical connection 760.

First data bridge 710 and second data bridge 720 may be respectively implemented similar to data bridges 110, 210, 410, 610, and 620, as described above. First and second transceivers 711 and 721 may be respectively implemented similar to transceivers 111, 211, 611, and 621, as described above. First and second logic circuits 712 and 722 may be respectively implemented similar to logic circuits 112, 212, 612, and 622, as described above. Electrical conductor 751 may be implemented similar to electrical conductors 151, 251, and 651, as described above. Electrical conductor 752 may be implemented similar to electrical conductors 152, 252, and 652, as described above. Electrical conductor 761 may be implemented similar to electrical conductors 161, 261, and 661, as described above. Electrical conductor 762 may be implemented similar to electrical conductors 162, 262, and 662, as described above. First mechanical connection 750 may be implemented similar to first mechanical connections 150, 250, 450, and 650, e.g., as an ISOFIX connection, as described above. Second mechanical connection 660 may be implemented similar to second mechanical connections 160, 260, 460, 560, and 660, as described above, e.g., via a seatbelt, and may provide a data link to communicate data with communication network 190 of the vehicle and deliver power to first data bridge 710 from power source 180 of the vehicle via second data bridge 720. Data may be communicated through second mechanical connection 760 using a one-wire protocol, e.g., LIN or DC-LIN, without limitation. Peripheral device 730 may be implemented similar to peripheral devices 230, 430, and 530, as previously described. Components 730a-730f may be respectively implemented similar to components 230a-230f, as previously described.

Data link system 700 may include a third logic circuit 742 of the vehicle communicatively coupled to vehicle communication network 190. Third logic circuit 742 may be implemented in any suitable manner, such as by a processor, microcontroller (MCU), an application specific integrated circuit (ASIC), a field programmable gate array (FPGA), a programmable logic device (PLD), state machine, reprogrammable logic or hardware, analog circuitry, digital circuitry, digital logic, instructions for execution by a processor, or any suitable combination thereof, without limitation. Data link system 700 may include alert system 740 of the vehicle, which may be used to provide alerts or take other corrective actions in response to signals received from either second logic circuit 722 or third logic circuit 742 via vehicle communication network 190. Vehicle alert system 740 may include various vehicle subsystems, e.g., headlights 740a, horn 740b, door locks 740c, windows 740d, wireless communication system 740e, and alarm system 740f, without limitation. Wireless communication system 740e may be a standalone communication system or part of a vehicles emergency assistance system such as OnStar, without limitation. Wireless communication system 740e may be used to notify an owner of the vehicle or emergency services. Wireless communication system 740e may use wireless communication protocols, e.g., WiFi, Bluetooth, or cellular. Alarm system 740f may be a part of a vehicle security system, e.g., a theft protection system.

An example operation of data link system 700 is provided for a scenario where a child has been left unattended in a vehicle and is experiencing a hazardous condition. For this example, peripheral device 730 may include a car seat and may be implemented similar peripheral device 430 including car seat 431, as previously described, where sensors 730a, 730b, and 730c correspond to sensors 430a, 430b, and 430c, respectively. As an example, first logic circuit 712 may receive a signal, e.g., from weight sensor 730a indicating that an occupant is in the car seat. In some examples, first logic circuit 712 may receive a first signal from temperature sensor 730b indicating that the temperature inside the vehicle has exceeded a threshold value, e.g., 80° F., 90° F., or 100° F., without limitation. As another example, first logic circuit 712 may receive a first signal from temperature sensor 730b indicating that the body temperature of the occupant has exceeded a threshold value, e.g., 100° F., without limitation. As another example, logic circuit 712 may receive a signal, e.g., from oxygen sensor 730c indicating that an oxygen level (e.g., oxygen level of the occupant or inside the vehicle) is below a threshold value. First logic circuit 712 may process the first signal to develop a second signal for transmission via the second mechanical connection 760 which may provide a data link to vehicle communication network 190. First logic circuit 712 may communicate the second signal to first transceiver 711. First transceiver 711 may use a one-wire protocol to communicate the second signal through second mechanical connection 760 of the second safety system of the vehicle, which may be a seatbelt connection of a seatbelt system. The seatbelt system may be implemented similar to seatbelt system 365, as previously described. The second signal may be received by second transceiver 721 and communicated to second logic circuit 722. Second logic circuit 722 may process the second signal to develop a third signal to indicate to third logic circuit 742 that an alert system of the vehicle is to be activated. Second logic circuit 722 may communicate the third signal to third logic circuit 742 via vehicle communication network 190. Third logic circuit 742 may process the third signal to determine which components of vehicle alert system 740 to activate. Third logic circuit 742 may then activate components of the vehicle alert system 740. For example, third logic circuit 742 may cause the headlights 740a to flash, the horn 740b to blow, the windows 740d to roll down, the doors 740c to unlock, the alarm system 740f to activate, or any combination thereof. Third logic circuit 742 may also initiate communication via wireless communication system 740e, with an owner or operator of the vehicle to alert them of the presence of an occupant and the potentially hazardous conditions within the vehicle (e.g., high or low temperature, low oxygen level, without limitation). In some example, third logic circuit 742 may initiation communication with emergency services (e.g., 911 services) and may provide information regarding the detected hazardous condition and the location of the vehicle. In some examples, third logic circuit 742 may perform functions of second logic circuit 722, e.g., processing the second signal to develop the third signal to indicate an alert system of the vehicle to be activated. In some examples, logic circuit 712 may initiate an alert, e.g., via audio circuit 730e, and may take corrective actions, e.g., via actuator 730d. In this manner, data link system 700 may be used to monitor the condition of an occupant of a vehicle and alert others and take corrective actions if it is determined the occupant may be in a hazardous condition.

Figure 8:
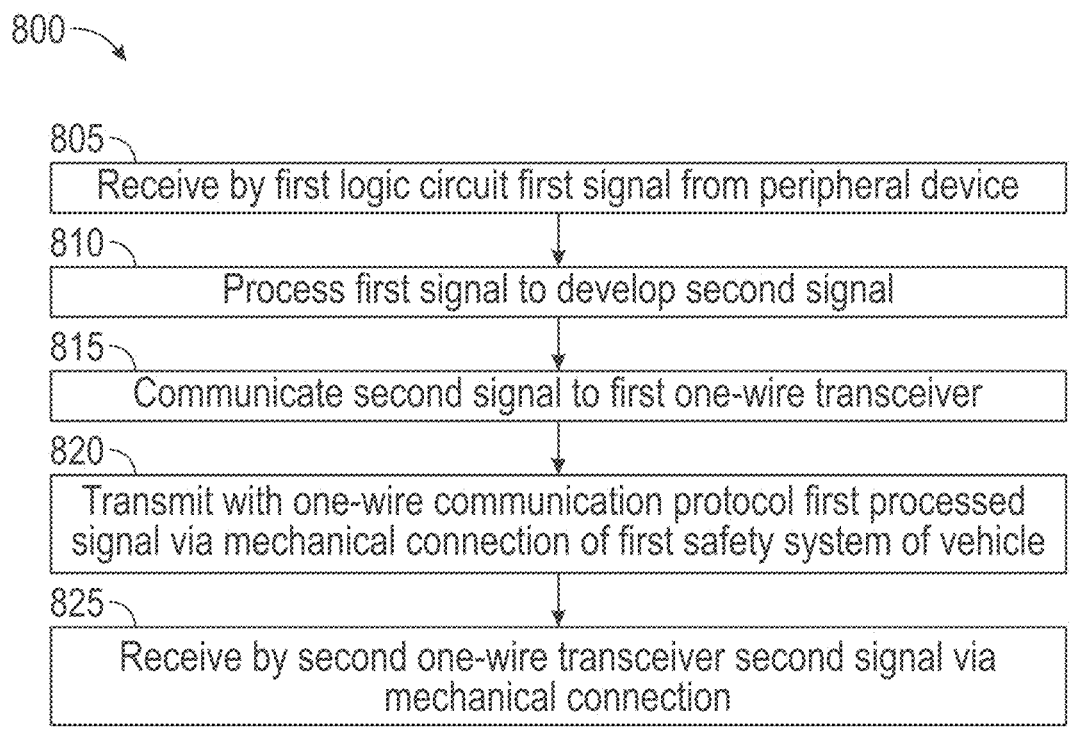
FIG. 8 illustrates a method of using a data link circuit.

Referring to FIG. 8, a flowchart is provided of an example method 800 for using a data link circuit (e.g., data link circuit 100 or 200) or a data link system (e.g., data link system 600 or 700) in accordance with the present disclosure. In some examples, the method 800 may be executed with more or fewer operations than shown in FIG. 8, and the operations shown in FIG. 8 may be optionally omitted, repeated, performed in a different order, performed in parallel, or recursively.

At 805, a first logic circuit may receive a first signal from a peripheral device. At 810, the first logic circuit may process the first signal to develop a second signal. At 815, the first logic circuit may communicate the second signal to a one-wire transceiver. At 820, the first one-wire transceiver may transmit, using a one-wire protocol (e.g., LIN or DC-LIN, without limitation), the second signal via a mechanical connection of a vehicle safety system (e.g., a seatbelt connection of a seatbelt system). At 825, the second signal may be received by a second one-wire transceiver via the mechanical connection of the vehicle safety system.

Figure 9:
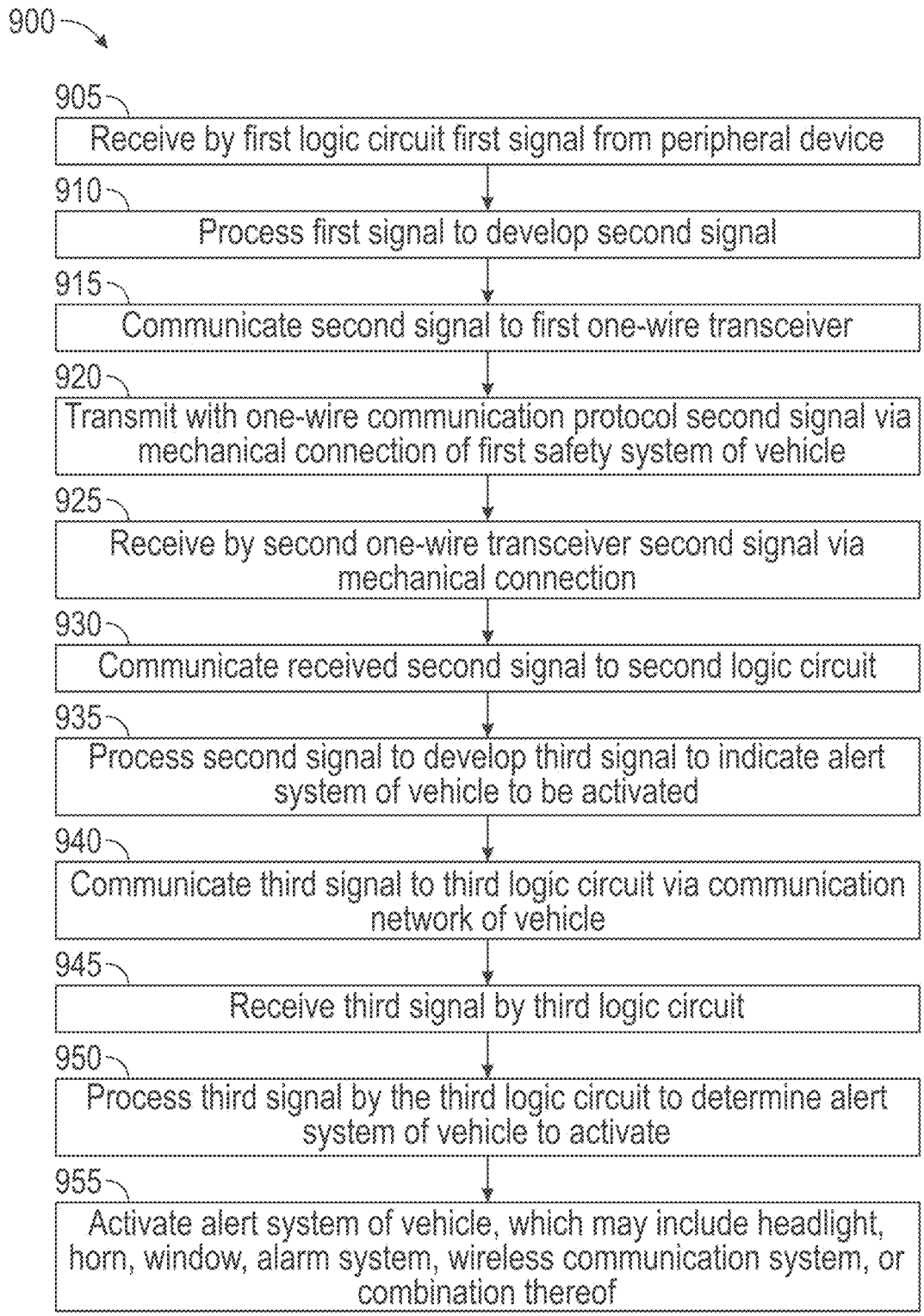
FIG. 9 illustrates a method of using a data link system.

Referring to FIG. 9, a flowchart is provided of an example method 900 for using a data link circuit (e.g., data link circuit 100 or 200) or a data link system (e.g., data link system 600 or 700) in accordance with the present disclosure. In some examples, the method 900 may be executed with more or fewer operations than shown in FIG. 9, and the operations shown in FIG. 8 may be optionally omitted, repeated, performed in a different order, performed in parallel, or recursively.

Blocks 905-925 of method 900 respectively correspond to blocks 805-825 of method 800 as described above and are not repeated for brevity. At 930, the second one-wire transceiver may communicate the received second signal to a second logic circuit. At 935, the second logic circuit may process the second signal to develop a third signal to indicate an alert system of the vehicle to be activated. At 940, the third signal may be communicated to a third logic circuit via a communication network of the vehicle. At 945, the third signal may be received by the third logic circuit. At 950, the third signal may be processed by the third logic circuit to determine which alert system of the vehicle to activate. At 955, the alert system may be activated, and may include flashing headlights, honking horn, activating windows, activating alarm system, wireless communication system, or a combination thereof.

While the present disclosure has been described herein with respect to certain illustrated examples, those of ordinary skill in the art will recognize and appreciate that the present invention is not so limited. Rather, additions, deletions, and modifications to the illustrated and described examples may be made without departing from the spirit and scope of the present disclosure and aspects hereinafter claimed along with their legal equivalents. In addition, features from one example may be combined with features of another example while still being encompassed within the scope of the present disclosure as contemplated and described.

What is claimed is:

1. A vehicle safety device comprising:
   a transceiver;
   a first logic circuit electrically coupled to the transceiver;
   a first electrical conductor electrically coupled to the transceiver and to a first mechanical connection of a first vehicle safety system of a vehicle, the first mechanical connection comprises an ISOFIX connection, the first safety system is an ISOFIX system, and the first mechanical connection to provide a first electrical path to a ground of the vehicle; and
   a second electrical conductor electrically coupled to the transceiver and to a second mechanical connection of a second vehicle safety system of the vehicle, the second vehicle safety system separate from the first vehicle safety system, the second mechanical connection comprises a seatbelt connection, the second safety system is a seatbelt system, and the second mechanical connection to provide a data link to communicate data with a communication network of the vehicle;
   one or more peripheral devices communicatively coupled to the first logic circuit, the one or more peripheral devices comprise one or more oxygen sensors to monitor an oxygen level of an occupant of the vehicle is outside of a normal range;
   an oxygen disperser that is activated to increase the oxygen level in the vehicle when the oxygen level of the occupant of the vehicle is outside of the normal range.

2. The device of claim 1, wherein the second mechanical connection provides a second electrical path for power delivery from a power source of the vehicle, comprising a power converter electrically coupled to the second electrical conductor, the power converter to convert power received via the second electrical path at a first voltage to a second voltage.

3. The device of claim 2, wherein the power converter is a DC-to-DC converter to provide DC power at the second voltage to one or more peripheral devices electrically coupled to the power converter.

4. The device of claim 1, comprising one or more peripheral devices communicatively coupled to the first logic circuit, the one or more peripheral devices further comprise one or more sensors to monitor a condition of the occupant of the vehicle.

5. The device of claim 4, wherein the one or more sensors comprise a weight sensor, a temperature sensor, or a combination thereof.

6. The device of claim 4, wherein the one or more peripheral devices comprise a car seat to secure the occupant within the vehicle via the first mechanical connection, the second mechanical connection, or a combination thereof.

7. The device of claim 4, wherein:
   the occupant is a pet; and
   the one or more peripheral devices comprise a pet tether to secure the pet within the vehicle via the first mechanical connection, the second mechanical connection, or a combination thereof.

8. The device of claim 3, wherein the one or more peripheral devices further comprise a portable computing device.

9. The device of claim 1, wherein the transceiver utilizes a one-wire communication protocol to communicate data via the data link of the second mechanical connection.

10. The device of claim 9, wherein the one-wire communication protocol is a local interconnect network protocol.

11. A vehicle safety method comprising:
    receiving by a first logic circuit a first signal from a peripheral device;
    processing by the first logic circuit the first signal to develop a second signal;
    communicating the second signal to a first one-wire transceiver;
    transmitting with a one-wire communication protocol the second signal via a mechanical connection of a first safety system of a vehicle, the mechanical connection comprises an ISOFIX connection, the first safety system is an ISOFIX system, and the mechanical connection to provide an electrical path to a ground of the vehicle; and
    receiving by a second one-wire transceiver the second signal via a second mechanical connection of second safety system of the vehicle, the second vehicle safety system separate from the first vehicle safety system, to provide a data link to communicate data with a communication network of the vehicle;
    wherein the peripheral device monitors whether an oxygen level of an occupant of the vehicle is outside of a normal range via one or more oxygen sensors; and
    when the oxygen level of the occupant of the vehicle is outside of the normal range, an oxygen disperser is activated to increase the oxygen level in the vehicle.

12. The method of claim 11, comprising:
communicating the received second signal to a second logic circuit; and
processing by the second logic circuit the second signal to develop a third signal, the third signal to indicate an alert system of the vehicle to be activated.

13. The method of claim 12, comprising:
communicating the third signal to a third logic circuit via a communication network of the vehicle;
receiving by the third logic circuit the third signal;
processing by the third logic circuit the third signal to determine the alert system of the vehicle to be activated;
activating the alert system of the vehicle.

14. The method of claim 12, wherein the alert system of the vehicle comprises a headlight, a horn, a window, an alarm system, a wireless communication system, or a combination thereof.

15. A vehicle safety system comprising:
a first data bridge comprising a first transceiver and a first logic circuit;
a first mechanical connection electrically coupled to the first data bridge, the first mechanical connection comprises an ISOFIX connection, a first vehicle safety system is an ISOFIX system and the first mechanical connection to provide a vehicle ground via the first vehicle safety system of a vehicle;
a second data bridge comprising a second transceiver and a second logic circuit, the second data bridge electrically coupled to a power source of the vehicle and communicatively coupled to a communication network of the vehicle; and
a second mechanical connection electrically coupled to the first data bridge and the second data bridge via a second vehicle safety system of the vehicle separate from the first vehicle safety system, the second mechanical connection comprises a seatbelt connection; and the second safety system is a seatbelt system, the second mechanical connection to provide an electrical path for power delivery from the power source of the vehicle and a data link for data communication with the communication network of the vehicle via the second data bridge;
one or more peripheral devices communicatively coupled to the first logic circuit, the one or more peripheral devices comprise one or more oxygen sensors to monitor an oxygen level of an occupant of the vehicle is outside of a normal range;
an oxygen disperser that is activated to increase the oxygen level in the vehicle when the oxygen level of the occupant of the vehicle is outside of the normal range.

16. The system of claim 15, comprising one or more sensors communicatively coupled to the first logic circuit of the first data bridge to monitor the physical condition of the occupant of the vehicle.

17. The system of claim 16, comprising:
a third logic circuit of the vehicle communicatively coupled to the communication network of the vehicle; and
an alert system of the vehicle communicatively coupled to the third logic circuit.

18. The system of claim 16, wherein the alert system of the vehicle comprises a headlight, a horn, a window, an alarm system, a wireless messaging system, or a combination thereof.

* * * * *